United States Patent [19]

Mundus

[11] Patent Number: 4,959,114

[45] Date of Patent: Sep. 25, 1990

[54] PROCESS FOR PRODUCING FLATTENED GUSSETED TUBING FROM FLAT PLASTIC FILM

[75] Inventor: Friedhelm Mundus, Lengerich, Fed. Rep. of Germany

[73] Assignee: Windmoller & Holscher, Lengerich, Fed. Rep. of Germany

[21] Appl. No.: 368,720

[22] Filed: Jun. 21, 1989

[30] Foreign Application Priority Data

Jun. 21, 1988 [DE] Fed. Rep. of Germany ....... 3820941

[51] Int. Cl.$^5$ .............................................. B32B 31/16

[52] U.S. Cl. .................................... 156/204; 156/465; 493/226

[58] Field of Search .................. 493/226; 383/10, 120; 156/200, 201, 202, 251, 152, 553, 465, 290, 203, 204

[56] References Cited

U.S. PATENT DOCUMENTS

| | | | |
|---|---|---|---|
| 3,593,622 | 7/1971 | Sengewald | 493/226 X |
| 4,571,235 | 2/1986 | Benoit | 156/251 X |
| 4,597,749 | 7/1986 | O'Brien et al. | 496/226 |

*Primary Examiner*—Michael W. Ball
*Assistant Examiner*—Michele K. Yoder
*Attorney, Agent, or Firm*—Fleit, Jacobson, Cohn, Price, Holman & Stern

[57] ABSTRACT

In a process for producing flattened gusseted tubing from a flat continuous film of synthetic thermoplastic, gussets are formed in the flat continuous film in such a manner that lateral marginal portions of the film are superposed adjacent to the outer edge of a covering gusset. A portion of the covering gusset is then reversely folded on itself, the marginal portions are subsequently provided with a longitudinal seam weld in a region which was aligned with the outer edge of the covering gusset before the gusset portion was reversely folded, and the reversely folded portion is then unfolded.

3 Claims, 3 Drawing Sheets

Fig. 3
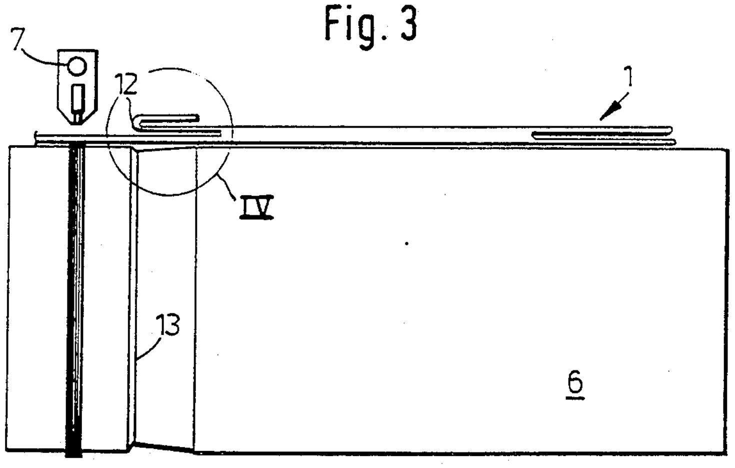
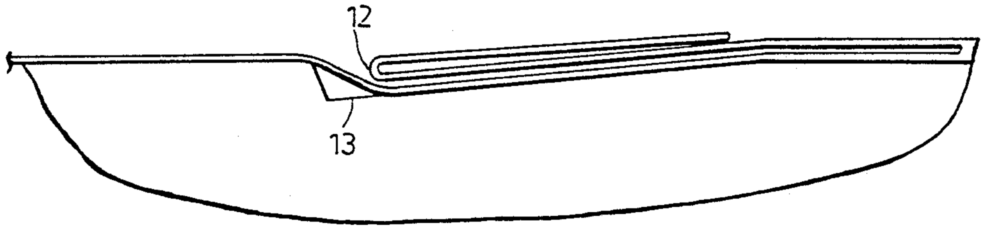
Fig. 4

PROCESS FOR PRODUCING FLATTENED GUSSETED TUBING FROM FLAT PLASTIC FILM

BACKGROUND OF THE INVENTION

1. Field of the Invention

This invention relates to a process for producing flattened gusseted continuous tubing from a flat continuous film of synthetic thermoplastic, wherein gussets are formed in the film and the film is laid in the form of the continuous tubing in such a manner that the lateral marginal portions thereof are superposed adjacent to the outer edge of a covering gusset, and the marginal portions are joined by a longitudinally extending seam weld which closes the continuous tubing.

2. Description of the Prior Art

In a process of the above kind which is disclosed in German Patent Publication 15 36 284, the contents of which is expressly incorporated herein by reference, the superposed marginal portions of the tubing which is constituted by the folded flat continuous film are joined by welding by means of welding rollers, which are spaced from the outer fold line of the covering gusset portion, and a seam weld is thus formed which protrudes outwardly beyond the gussets and has protruding edges which are unsightly and impart an unattractive, unsymmetrical appearance to a carrying bag made from the continuous tubing.

SUMMARY OF THE INVENTION

It is an object of the invention to provide a process of the kind described hereinbefore and which can be used to produce continuous tubing for making sacks or bags in which the seam welds by which the continuous tubing is closed are less unsightly than in the known process.

In accordance with the invention, a portion of the gusset which covers the still unwelded marginal portions of the continuous film is reversely folded on itself, the marginal portions are subsequently provided with the longitudinal seam weld in a region which, in a top plan view, is aligned with the outer edge of the outer edge of the covering portion when said gusset portion has not yet been reversely folded, and the reversely folded portion is then backfolded. The process can be used to produce continuous tubing from flat continuous plastic films in such a manner that the outer edges of the gussets or the outer edges of the gussets and seam welds are flush and the seam welds are no longer apparent as unsymmetrically protruding portions. For this reason carrying and other bags having an attractive shape can be made from gusseted continuous tubing made by the process in accordance with the invention.

If required, the edges of the marginal portions of the continuous film may be trimmed when said marginal portions have been joined by welding.

In a preferred embodiment of the invention, the continuous film formed with gussets is trained as a loop around a welding cylinder between two guide rollers and the covering part of the gusset is reversely folded before the continuous film contacts the welding cylinder. The reverse folding may be effected with conventional reverse folding devices. The reversely folded portion will then be fixed because it assumes an arcuate curvature as it moves around the welding cylinder.

An apparatus for carrying out the above process, in accordance with the invention, is distinguished in that the welding cylinder is provided with an annular peripheral groove or step, which is axially spaced from the annular peripheral welding portion of said cylinder and which, during the movement of the continuous film around the welding cylinder, receives the bend that has been formed by the reverse folding of the covering portion of the gusset. Such design of the welding cylinder in accordance with the invention ensures that the bend cannot be set as the continuous film moves around the welding cylinder and that the bend will no longer be visible when the reversely folded portion has been backfolded.

In accordance with a further feature of the invention a guide roller on the delivery side of the welding cylinder is provided with a circular trimming knife for cutting off those edge portions of the film which protrude beyond the longitudinal seam weld.

BRIEF DESCRIPTION OF THE DRAWINGS

FIG. 3 is a front elevation showing the welding cylinder shown in FIG. 2 including a hot air nozzle and in sectional view showing the continuous tubing trained around said cylinder.

FIG. 4 is an enlarged view of the circled portion in FIG. 3.

DETAILED DESCRIPTION OF THE PREFERRED EMBODIMENT

Figure 1:
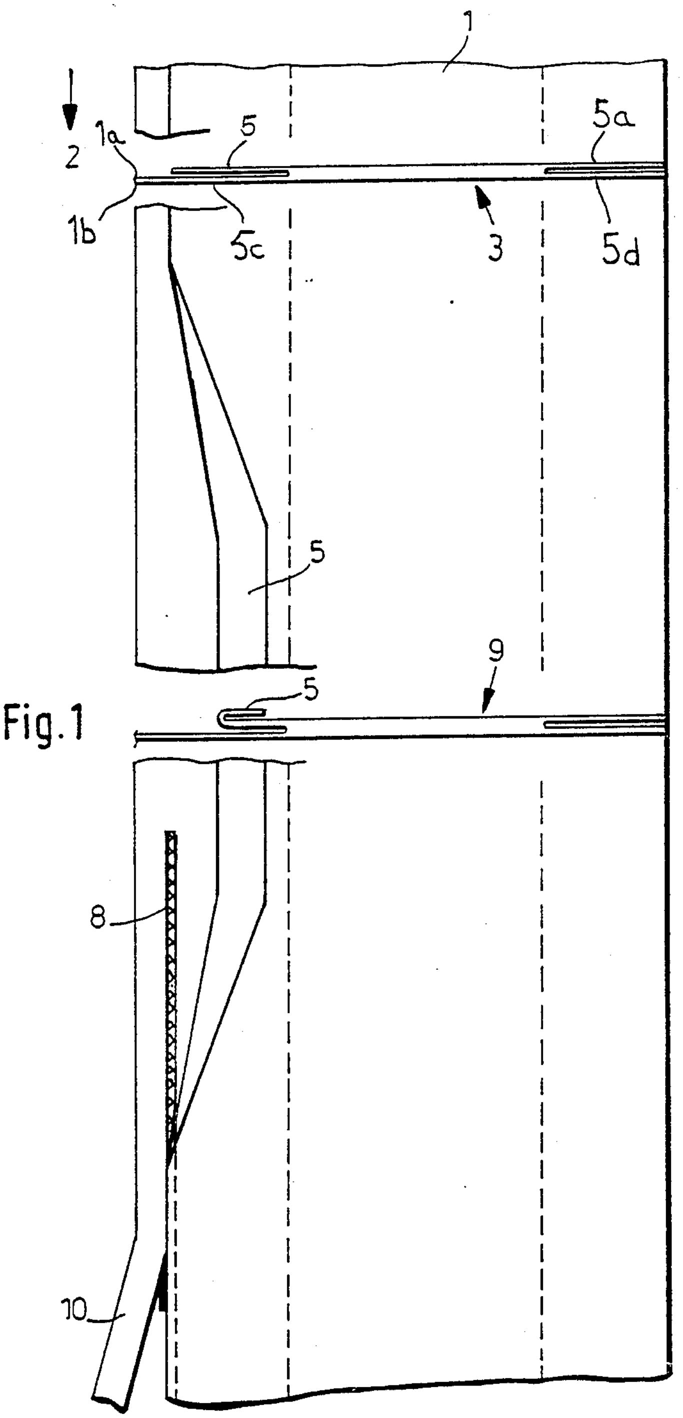
FIG. 1 is a somewhat diagrammatic top plan view of a continuous film which has been folded to form gusseted tubing and which is shown during several processing steps, and in cross-section, before and after the reverse folding of a gusset portion.

An illustrative embodiment of the invention will now be explained in detail with reference to the drawing.

FIG. 1 is a top plan view showing wound-off continuous plastic tubing 1, which has been made by folding and lengthwise gusseting a flat web in a generally known manner and which is moved continuously in a direction of travel indicated by arrow 2. As the folded continuous tubing 1 moves around a deflecting roller 4, (FIG. 2), the tubing has a cross-sectional shape indicated at 3 with upper gusset portions 5, **5*a*, and lower gusset portions 5*c*, 5*d*. It is evident that lower gusset portion 5*c* is extended and includes the superimposed web edges 1*a*, 1*b*. As soon as the gusseted continuous tubing 1 has moved past the deflecting roller 4, the upper double layer 5 which constitutes the upper gusset portion of the continuous tubing is reversely folded inwardly on itself by suitable deflection or folding means well known in the art. After such reverse folding, the continuous tubing 1 is moved around a welding cylinder 6 and is welded by means of a semicircular hot air nozzle 7, which is disposed above the welding cylinder 6. The welding results in the formation of a longitudinal seam weld 8 which is apparent from FIG. 1. The cross-sectional shape 9 which is assumed by the continuous tubing as it moves over the welding cylinder 6 is apparent from FIGS. 1, 3 and 4**.

As soon as the continuous tubing provided with the longitudinal seam weld 8 departs from the welding cylinder 6, the gusset portion 5 which has been reversely folded is unfolded so that the two two-ply gusset portions 5 and 5*c* are flush and lie one over the other and the seam weld 8 no longer protrudes laterally.

Figure 2:
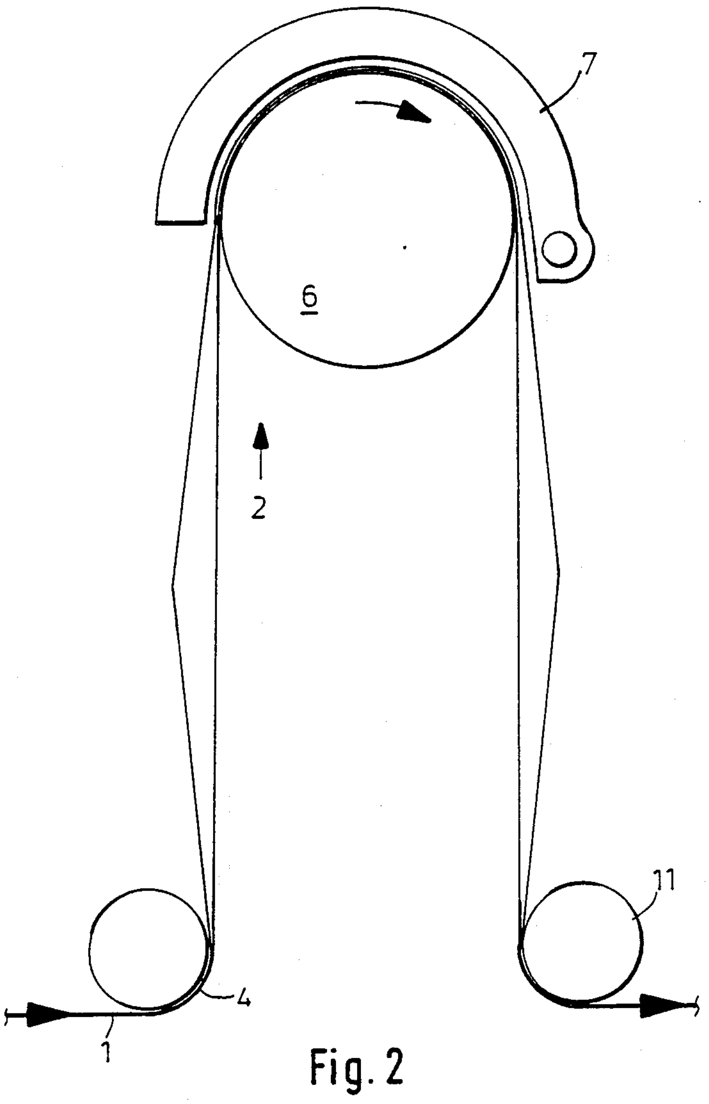
FIG. 2 is a side elevation of a welding cylinder, a continuous film trained around said cylinder, and guide rollers for guiding the continuous film as it moves to and from the welding cylinder.

Any side strip 10 which remains of gusset portion 5*c* outside of weld 8 is subsequently cut off by a knife, which may constitute, e.g., a part of the lower right-hand reflecting roller 11 shown in FIG. 2.

In order to prevent a sharp kinking of the bend 12 as it moves around the welding cylinder 6, the cylinder has an annular peripheral recess 13, which is adapted to receive the bend 12 without squeezing. In that case a squeezed-in bend will no longer be apparent when the portion 5 has been backfolded.

I claim:

1. A process for producing flattened gusseted tubing from a flat continuous film of synthetic thermoplastic which comprises forming lengthwise edge gussets in the film with lateral marginal portions of the film being superposed adjacent to an outer edge of a covering gusset of the film, reversely folding a portion of the covering gusset in on itself, providing the marginal portions with a longitudinal seam weld in a region of the film which in plan view was substantially aligned with an outer edge of the covering gusset before the gusset was reversely folded, and then unfolding the reversely folded portion of the gusset.

2. A process according to claim 1, which includes the step of trimming edges of the marginal portions of the film when said marginal portions have been provided with the seam weld.

3. A process according to claim 1, wherein the gusseted film is trained as a loop around a welding cylinder between two guide rollers and the covering gusset is reversely folded before the continuous film contacts the welding cylinder.

* * * * *